United States Patent

[11] 3,601,296

[72] Inventors Eric G. Pick
Dallas;
Jerry B. Medders, Van Alstyne; Lawrence T. Loftus, Jr., Garland, all of, Tex.

[21] Appl. No. 787,834
[22] Filed Dec. 30, 1968
[45] Patented Aug. 24, 1971

[73] Assignee Texas Instruments Incorporated
Dallas, Tex.

[54] DEVICE FOR BREAKING SCRIBED SLICES OF SEMICONDUCTOR MATERIAL
15 Claims, 5 Drawing Figs.

[52] U.S. Cl. .......... 225/103, 29/413, 225/2, 225/96.5
[51] Int. Cl. .......... B26f 3/00
[50] Field of Search .......... 225/93, 103, 96.5, 2, 96; 29/413, 583

[56] References Cited

UNITED STATES PATENTS

| | | | |
|---|---|---|---|
| 3,040,489 | 6/1962 | Costa | 225/2 X |
| 3,105,623 | 10/1963 | Hobbs | 225/103 X |
| 3,206,088 | 9/1965 | Meyer et al. | 225/103 X |
| 3,396,452 | 8/1968 | Sato et al. | 225/2 X |

*Primary Examiner*—Frank T. Yost
*Attorneys*—James O. Dixon, Andrew M. Hassell, Harold Levine, Melvin Sharp, John E. Vandigriff, Michael A. Sileo, Jr. and Henry T. Olsen ABSTRACT: A device for breaking scribed slices of semiconductor material to produce individual bars of the semiconductor material by moving a force applying member, the force exerted by which is predetermined, such as an adjustable spring biased roller, over a scribed slice of semiconductor material supported by a platen which preferably is covered with an elastomeric pad.

INVENTORS
ERIC G. PICK
JERRY B. MEDDERS
LAWRENCE T. LOFTUS JR.

ATTORNEY

DEVICE FOR BREAKING SCRIBED SLICES OF SEMICONDUCTOR MATERIAL

This invention relates to the production of semiconductor devices, and more particularly, to a method of and a device for breaking scribed slices of semiconductor material to produce individual bars of the semiconductor material.

By various masking, etching, deposition and diffusion techniques well-known to those skilled in the art, large numbers of identical semiconductor devices or integrated circuits may be produced on a thin slice of semiconductor material, the devices or integrated circuits being separated by spaced parallel rows which define rectangular areas or bars of semiconductor material, each of which has a device or an integrated circuit formed therein. To separate the individual bars, the slice is scribed with a diamond stylus or the like along each of the rows. After scribing, a compressive force is applied to the surface of the slice to break the slice along the line scribed therein and form individual bars of the semiconductor material, each of which may contain a semiconductor device or complete integrated circuit, as mentioned above.

Heretofore, the most prevalent method for breaking the slices of semiconductor material, after scribing, has been to place the semiconductor slice between layers of a lint free paper which has been wet with a solution, such as a mixture of methanol and water, following which the slice, contained between the layers of paper, is placed on a rubber pad with the surface thereof having the circuits formed therein facing downwardly toward the pad. An operator manually rolls a smooth surfaced roller across the paper adhering to the back surface of the slice, much in the manner that a rolling pin is used to flatten dough. To minimize breakage of the individual bars of semiconductor material, it is necessary to align the roller parallel to one set of scribe lines before indexing the slice 90° and passing it over the second set of scribe lines. In order to determine in which direction a set of scribe lines is oriented, the operator first breaks a few rows of the bars near the edge of the slice with the roller, the operator being unable to initially determine the direction of the rows since the slice is sandwiched between layers of paper and is placed on the pad with the scribed surface turned downwardly. After breaking a few rows, the operator lifts the roller and visually inspects the broken material, which inspection permits accurate alignment of the slice and roller so that the roller may be passed parallel to the sets of scribe lines to be first broken. The slice is then indexed 90° and the set of scribe lines perpendicular to those first broken are then broken by manually passing the roller over the slice.

A considerable amount of breakage and destructive chipping of the individual bars of semiconductor material formed in the semiconductor slices results from this manual breaking operation since the force applied by the operator cannot be accurately controlled. Thus, the operator may apply too much force causing breakage or chipping of the individual bars of silicon or not apply enough force to break the material along all of the scribe lines.

Since a great deal of time is spent producing the slice of semiconductor material and in forming the integrated circuits on the slice, the breakage of or destructive chipping of the bars of semiconductor material containing the integrated circuits is extremely costly.

Due to the many different sizes of bars formed on different types of semiconductor slices, the optimum breaking force to be applied to a particular slice varies depending upon the thickness of the slice and the size of the bars formed on the slice. With the manual breaking operation described above, it is virtually impossible to vary the force applied to different types of slices in an optimum manner.

The present invention provides a method and a device permitting accurate control of the force applied to scribed sizes of semiconductor material to minimize the breakage and destructive chipping of the individual bars and permits adjustment of the force so that different size slices may be broken by the device under optimum conditions. By use of a preferred embodiment of the invention it is possible to determine the amount of force which will be exerted upon the slice and to adjust the amount of force to be applied to an optimum magnitude.

The method of the present invention may be generally described as a method of breaking scribed slices of semiconductor material to produce individual bars of semiconductor material, the semiconductor material having a first set of parallel scribe lines and a second set of parallel scribe lines which intersect to define bars of the semiconductor material, by first positioning said slice upon a support member that has an upper surface geometrically similar to the lower surface of said slice. A force applying member is then positioned to apply a predetermined force to the upper surface of said scribed slice along a finite zone of abutment. This force applying member is then moved over the upper surface of said slice first in a direction perpendicular to the first set of scribe lines and second in a direction perpendicular to said second set of scribe lines so that the zone of abutment travels over substantially the complete surface so as to break said scribed slice along the first and second sets of scribe lines.

The device of the present invention may be generally described as being a device for breaking scribed slices of semiconductor material to produce individual bars of the semiconductor material, which device includes a semiconductor slice supporting platen having a top planar surface and a roller positioned above said platen so that the roller has its longitudinal axis parallel to the top surface of the platen. Means are provided for adjusting the vertical distance between the roller and the platen and for moving the platen relative to the roller so that slices of semiconductor material supported by the platen will be broken along the lines scribed therein during movement of the roller relative to the platen. In a more particular aspect, the invention includes means permitting upward movement of the roller when a force is exerted against the bottom thereof and means applying a biasing force against the roller tending to force the roller back to a predetermined distance above the platen. In order to determine with accuracy the amount of force being applied to the slices of semiconductor material, means may also be provided for sensing the force, generating a signal proportional to the magnitude thereof and displaying a visual indication of the magnitude of the force.

To be more specific, reference is made to the drawings, in which.

Figure 5:
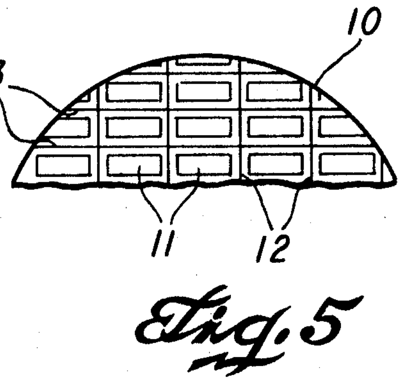
FIG. 5 is a cutaway plan view of an exemplary slice of semiconductor material of the type to be broken by the apparatus of the present invention.

Reference is first made to FIG. 5 which illustrates a segment of a conventional slice of semiconductor material 10. The complete slice may have a diameter of 1 inch and a thickness of 0.007 inch, for example, and have a plurality of bars 11 formed thereon. Each bar may have semiconducting components, such as transistors, capacitors and diodes or complete integrated circuits formed therein. The bars 11 are spaced apart to form parallel rows in which have been placed, in a conventional manner, a first set of parallel scribed lines 13 and a second set of parallel scribed lines 12. The sets of scribed lines 13 and 12 are perpendicular to each other and define the bars 11 therebetween. The individual bars 11 may be separated by breaking slice 10 first along scribed lines 12, following which the slice 10 is then broken along scribed lines 13, a process which has heretofore been done most usually by a manual operation.

Figures 1, 2:
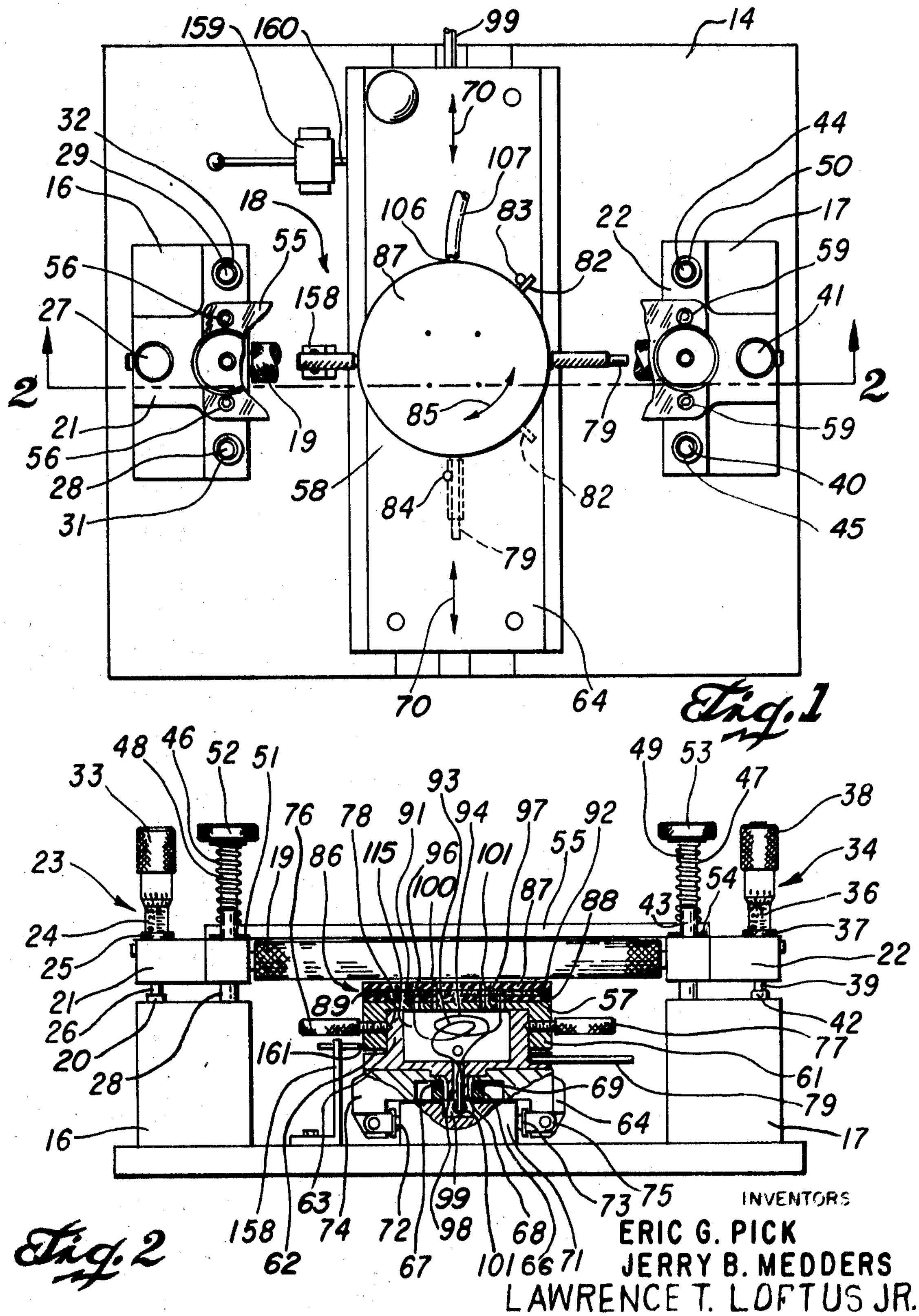
FIG. 1 is a top plan view, partially cutaway, of one embodiment of the present invention.
FIG. 2 is a cross-sectional view generally taken along line 2—2 of FIG. 1, but also illustrating, in elevation, some of the structure cutaway from FIG. 1.

For an understanding of the method and apparatus of the present invention, reference is made to FIG. 1, wherein a baseplate 14 has affixed thereto, in a conventional manner, pedestals 16 and 17 which define a gap 18 therebetween. Supported across gap 18 is a knurled roller 19, one end of which is rotatably supported within bearing means carried by a T-shaped plate 21, and the opposite end of which is similarly rotatably supported within bearing means carried by identical T-shaped plate 22. Plate 21 is supported above pedestal 16 by a micrometer assembly 23. The sleeve 24 of micrometer 23 is fixably attached to plate 21, as by a nut 25 so that the movable spindle 26 of micrometer 23 extends through an aperture 27, in plate 21, as particularly illustrated in FIG. 1. Spindle 26 abuts anvil 20 fixed to and supported by the top of pedestal 16. Plate 21 is mounted for vertical movement relative to pedestal 16 by guidepins 28 and 29 which are fixed to pedestal 16 and pass upwardly through apertures 31 and 32, respectively, in plate 21. Thus movement of thimble 33 of micrometer 23 permits adjustment of plate 21 relative to pedestal 16.

The opposite end of roller 19, as mentioned before, is rotatably supported by plate 22, which is provided with a micrometer assembly 34. Sleeve portion 36 of micrometer assembly 34 is secured to plate 22 by a nut 37 so that movement of thimble 38 of micrometer 34 will effect extension and withdrawal of spindle 39 through aperture 41 in plate 22. The bottom end of spindle 39 abuts anvil 42 which is affixed to pedestal 17. Vertical adjustment of plate 22 relative to pedestal 17 is permitted by slidable movement of plate 22 along guidepins 40 and 44 which pass through apertures 45 and 50, respectively, in plate 22, the guidepins being fixed at their lowermost ends to pedestal 17. Plates 21 and 22, and thus roller 19, the ends of which are rotatably supported by plates 21 and 22, are biased downwardly by springs 46 and 47, respectively, which are disposed about bolts 48 and 49, respectively. Bolt 48 passes through an aperture (not shown) in plate 21 and threadably engages a threaded aperture (not shown) in pedestal 16 so that rotation of bolt 48 will increase or decrease, depending upon the direction of rotation, the force exerted by spring 48 on plate 21, since one end of spring 48 engages a washer 51 supported on the top surface of plate 21 and the opposite end of the spring engages the head 52 of bolt 48. Bolt 49, similarly, passes through an aperture (not shown) in plate 22 and at the lower end thereof threadably engages a threaded aperture (not shown) in pedestal 17 so that rotation of bolt 49 by turning of head 53 will cause compression or relaxation, depending upon the direction of turning, of spring 47, one end of which abuts washer 54 supported on the surface of plate 22 and the other end of which abuts the lower surface of head 53 of bolt 49.

Above roller 19 is positioned bridge plate 55, of plexiglass or the like, one end of which is affixed by bolts 56 to plate 21 and the opposite end of which is fixed to plate 22 by bolts 59. The plexiglass serves to stabilize the plates 21 and 22 against stress created when the device is in use and may have a series of guide lines formed therein parallel to the roller 19.

Disposed in gap 18 beneath roller 19 is a cylindrical semiconductor slice supporting platen 58 provided with a top planar surface 57 which is parallel to the longitudinal axis of roller 19. Platen 58 has a depending cylindrical skirt portion 61 which receives therewithin the cylindrical wall 62 of an indexing housing 63. The index housing 63 is rotatably supported upon a movable carriage 64. Index housing 63 and carriage 64 are maintained in abutment by nut 66 and spring washer 67 which are disposed about the centrally depending, externally threaded leg 68 of index housing 63, leg 68 passing downwardly through an aperture 69 in carriage 64. Carriage 64 is slidably supported upon guide rail 71 through bearing structures 72 and 73 in legs 74 and 75, respectively, of carriage 64. Carriage 64 is mounted for slidable movement along guide rail 71 in the direction indicated by arrows 70 in FIG. 1.

To permit rotational adjustment of platen 58 relative to index housing 63, platen 58 receives diametrically opposed setscrews 76 and 77 through skirt 61 thereof, the tapered tips of the screws 76 and 77 registering with a circular groove 78 in the cylindrical wall 62 of index housing 63. Index housing 63 may be moved through a 90° arc by adjustment of handle 79 between a first position, as illustrated in full line in FIG. 1, and a second position illustrated in phantom line in FIG. 1. Restriction of the movement of index housing 63 relative to carriage 64 is affected in one position by engagement of pin 82, which is affixed to index housing 63, and upstanding peg 83 affixed to carriage 64, and at the opposite extremity by engagement of handle 79 with upstanding peg 84, also attached to carriage 64. Rotation of handle 79 through an arc of 90°, i.e., to the position indicated by the phantom line in FIG. 1, will result in pin 82 being moved to the position indicated also on phantom line on FIG. 1. Thus, by rotation of handle 79 in the direction generally indicated by the arrow 85, platen 58 may be moved through an arc of 90°, the desirability of which will be hereafter explained. By relocation of pins 83 and 84 the arc through which the platen 58 may be moved can be enlarged or reduced.

Attached to the top planar surface 57 of platen 58 is an elastomeric pad 86 which comprises rubber layers 87 and 88 interposed between which is a resilient cement material 89. Embedded within the resilient cement material 89, which may, for example, be a silicon rubber cement, such as RTV—102 silicon rubber manufactured by General Electric, are embedded strain gauges 91 and 92 having electrical leads 93 and 94, respectively, which extend through apertures 96 and 97 provided in rubber layer 88 and platen 58 as well as aperture 98 in leg 68 of index housing 63. Electrical leads 93 and 94 are collected in a sheath 101 disposed within slot 99 of guide rail 71. The leads passing through sheath 101 communicate with the electrical circuit schematically illustrated in FIG. 4, which will be described hereafter.

Figure 3:
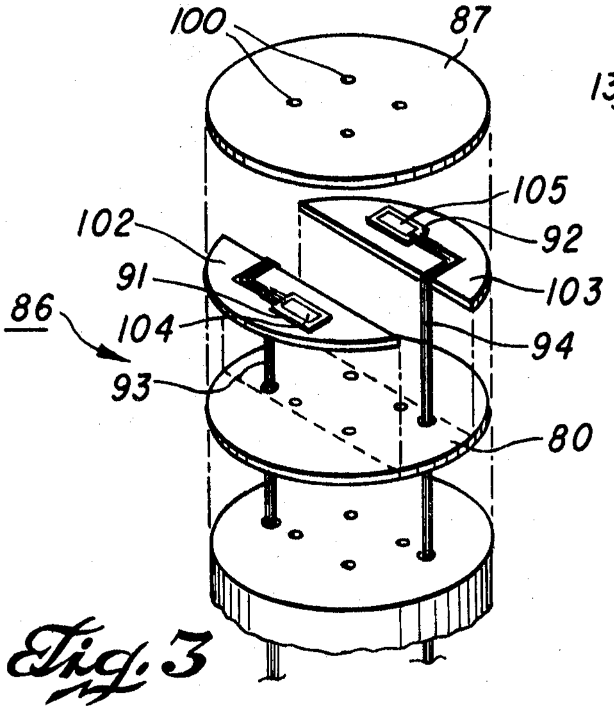
FIG. 3 is an exploded perspective view of part of the device illustrated in FIGS. 1 and 2.

As more clearly illustrated in FIG. 3, strain gauges 91 and 92 are affixed, in any suitable manner, to metal shims 102 and 103 and which are resistance-type strain gauges, for example, type FAE-25-12 S 6-L strain gauges manufactured by Baldwin-Lima-Hamilton Company. More specifically, strain gauges 91 and 92 have resistance elements 104 and 105, respectively, on the top surfaces and corresponding resistance elements (not shown) in FIG. 3 on the bottom surfaces thereof which serve to sense a strain created by a force externally applied to elastomeric pad 86. Specifically, a downward pressure on elastomeric pad 86 will result in the compression of the resistance elements 104 and 105 and the placement in tension of the corresponding resistance elements on the bottom surfaces of strain gauges 91 and 92. Compression of the resistances 104 and 105 will decrease the resistance of each element and, conversely, cause an increase in the resistance of the elements on the bottom surface of strain gauges 91 and 92 which are placed in tension. Strain gauges 91 and 92, as well as metal spring steel shims 102 and 103 to which they are attached will, when finally assembled as illustrated in FIG. 2, be embedded in the resilient cement 89 which is to be disposed between rubber layers 87 and 88 in a manner to render the top surface of rubber layer 87 level and parallel to the longitudinal axis of roller 19.

So that platen 58 may be returned to a predetermined central position for calibration and adjustment purposes, base 14 has affixed thereto a detent 159 having a pin 160 spring biased toward slide 64 so that the forward end thereof will enter a mating aperture in leg 74 of slide 64. Pin 160 is provided with a conventional locking mechanism which permits it to be locked in a withdrawn position when not in use. There is also attaching to base 14 a detent 158 within which is supported a spring loaded base 161 which travels on the surface of skirt 61 of platen 58 and engages a mating recess in skirt 61 when platen 58 is rotationally aligned with strain gauges 91 and 92 transverse to roller 19.

Rubber pads 87 and 88, as well as the index housing 63 are provided with registering apertures 100 which communicate with a vacuum source through the interior 115 of index housing 63, nipple 106, which extends outwardly through index housing 63, as illustrated in FIG. 1, and conduit 107.

The strain gauges 91 and 92 form part of an electrical circuit which serves to indicate magnitude of force applied to the elastomeric pad 86 and thus the force being exerted downwardly on platen 58. To be more specific, reference is made to FIG. 4 wherein the strain gauges 91 and 92 are illustrated schematically together with suitable circuitry for displaying an indication of the magnitude of the signal being generated by the strain gauges 91 and 92. More particularly, the top resistance element 104 of strain gauge 91, and the bottom resistance element **104*a* form opposite legs of a conventional bridge circuit 108. The remainder of the bridge includes fixed resistors 109, 110, 113, and 114 and two potentiometers 111 and 112, and potentiometer 111 being in parallel with the fixed resistor 113 and the potentiometer 112 being in parallel with a fixed resistor 114 to provide for more sensitive and stable quiescent adjustment. The bridge circuit 108 is supplied through a stepdown transformer 116 with an AC voltage of, for example, 6.3 v. The primary coil of stepdown transformer 116 is connected to a conventional 115 v. AC power source 117. The output of bridge circuit 108 is supplied by conductors 118 and 119 to a first amplifier stage 121. As with conventional bridge circuits, potentiometers 111 and 112 are adjusted to balance resistances 104 and 104*a* when no force is being exerted upon the strain gauges 91 and 92. The existence of a downward force upon strain gauge 91, for example, will, as explained before, decrease the resistance of resistor 104 and increase the resistance of resistor 104*a* thus algebraically adding the unbalance between the resistors. This unbalance is detected by amplifier 121, the voltage gain of which could typically be on the order of 400. The output of amplification stage 121 is, through a potentiometer 122, connected to ground to provide loading and impedance matching. The output of amplifier 121 is then, through the wiper arm 123 of potentiometer 122, capacitance coupled by capacitor 124 to a second stage amplifier 125, the voltage gain of which may be, for example, 50. The output of amplifier 125 is directly coupled to full wave rectifier 126. The output of rectifier 126 is impressed across a capacitor 127 upon the input of a high level detector circuit 128 and a low level detector circuit 129. There is, through a selector switch 131, impressed upon the high level circuit 128 an upper reference voltage level from a reference voltage source 137. Simultaneously, a lower reference voltage level also derived from voltage source 137, is also impressed, through selector switch 131, upon the input of lower level detector circuit 129. If the output of rectifier 126 exceeds the DC low level reference voltage from voltage source 137, the lower level detector circuit 129 trips and its output swings from a positive voltage to ground. This swing in voltages causes an emitter follower to turn off switch circuit 132, thus extinguishing lamp 133. Conversely, if the output of rectifier 126 is less than the lower reference voltage from the reference voltage source 137, level detector circuit 129 will swing from ground to a positive voltage causing switching circuit 132 to turn on lamp 133, thus providing a visual indication that the output of rectifier 126 has fallen below a predetermined minimum voltage level. Similarly, if the output of rectifier 126 exceeds the maximum voltage level from reference voltage source 137, the upper level detector circuit trips, changing its output to a low level which is detected by an emitter follower whose output turns off an inverting stage which turns on the standard switching circuit 134 allowing the upper lamp 136 to glow, thus providing an indication that the output of rectifier 126 is exceeding a maximum predetermined voltage level. Conversely, if the output of rectifier 126 is less than the reference voltage level from reference voltage source 137, the level detector circuit 128 switches from a low level to a high level which is followed by an emitter follower turning on the inverting stage which turns off switch 134, and extinguishes lamp 136. The magnitude of the maximum and minimum reference voltages from the reference voltage source 137 can be selected by means of a selector switch 131**, in a conventional fashion.

Without going into detail, the strain gauge 92 forms part of circuitry identical to that described above in connection with strain gauge 91. For example, the resistance elements 105 and **105*a* form part of conventional bridge circuit 138 identical to the bridge circuit 108. The power to bridge circuit 108 is supplied by a stepdown transformer 139. The output of bridge circuit 138 is amplified by amplifiers 141 and 143 which correspond to amplifiers 121 and 125 above. The output of amplifier 143 is rectified by rectifier circuit 144, the output of which is impressed upon a high level detector circuit 145 and a low level detector circuit 146 for comparison with the high and low level reference voltages, respectively from reference voltage source 152 controlled by selector switch 147. High level detector circuit 145 controls switching circuit 167 and low level detector circuit 146 controls switching circuit 148 for control of lamps 149 and 151, respectively. A conventional DC power supply 153 having a positive voltage output conductor 154 and a negative voltage output conductor 155 is provided for supplying power to the amplifiers and level detector circuits. The power supply for the lamps 133, 136, 149, and 151 is obtained from a positive DC voltage power supply 156 through its output conductor 157**.

Calibration procedure for determining force requirements for optimum breakage of different size slice material is as follows:

The micrometers 23 and 34 are adjusted until the bottom of roller 19 just barely touches the surface of the elastomeric pad 86 and then the roller 19 is raised or retracted about 0.002 of an inch by adjustment of micrometers 23 and 34. Representative slices of prescored material having known thicknesses and bar sizes are then selected for precalibration purposes. After movement of slide 64 downwardly, as viewed in FIG. 1, one of the slices is placed on elastomeric pad 86. Bolts 52 and 53 are retracted so that springs 46 and 47 exert a minimum amount of force on roller 19 and the carriage 64 moved under roller 19 to break the slice along a few scribe lines near the periphery of the slice. The carriage 64 is moved back and the slice examined to determine if the slice is positioned on elastomeric pad 86 so that the scribe lines 12 or 13, as the case may be, are parallel to roller 19. If not, setscrews 76 and 77 are retracted, platen 58 rotated relative to index housing 63 to align the scribe lines in a direction parallel to roller 19, and the set screws 76 and 77 reengaged to fix platen 58 relative to index housing 63. The carriage is then moved to pass elastomeric pad 86 and the slice supported thereon under roller 19 after which the slice is examined to determine if the biasing force being exerted by springs 46 and 47 has been sufficient to break the slice along the scribe lines parallel to roller 19. If the slice has not been adequately broken, the procedure above is repeated with the force exerted by springs 46 and 47 being increased by manipulation of bolt heads 52 and 53. When adequate breakage across the entire slice is first realized, the low level reference voltage output of reference voltage sources 137 and 152 are set to extinguish lamps 133 and 151, respectively, after the platen 58 is centrally positioned by use of detents 159 and 158. The force exerted by the springs 46 and 47 is then increased and the procedure repeated until a maximum optimum force is exceeded which will be evidenced by excessive breakage of the bars of material and destructive chipping of the sides of the bars. When it is realized that excessive force is being applied, the springs 46 and 47 are relaxed slightly by manipulation of bolt heads 52 and 53 and the high level reference voltage outputs of reference voltage sources 137 and 152 adjusted until the high level lamps 136 and 149, respectively, are extinguished after the platen 58 is centrally positioned by use of detents 156 and 158. Thus, for a given type of slice, the high and low reference voltages have been determined. The procedures described above are repeated for each variety of slice material which is to be broken, the multiple position selector switches 131 and 147 in each instance being moved to a different predetermined position before adjustment of the high and low voltage level outputs of reference level sources 137 and 152.

After calibration, an operator desiring to break a plurality of slices of material having a known thickness and bar size places a dummy slice having the same thickness on elastomeric pad 86 and positions the dummy slice under roller 19 with the detents 159 and 158 engaged. With the detents 159 and 158 engaged the force exerted by roller 19 is exerted directly down upon strain gauges 91 and 92. With the selector switches 131 and 147 set to the position found optimum for this particular variety of slice material, the heads 52 and 53 of bolts 48 and 49 are adjusted until lamps 133 and 136, and 149, and 151 are all extinguished thus indicating that the pressure being exerted upon the dummy slice upon the roller 19 is between the lower and upper reference levels on the left side of elastomeric pad 86, as well as upon the right side of elastomeric pad 86, as viewed in FIGS. 1 and 2. Slices to be broken are then placed upon elastomeric pad 86 and slide 64 advanced to break a few rows of the slice, following which slide 64 is retracted to permit alignment of the slice with roller 19 by use of set screws 76 and 77. The alignment of the slice and roller can be facilitated by use of the guide lines formed in plexiglass bridge plate 55. The slide 64 is then moved forward to permit roller 19 to pass over the entire slice of material, following which the handle 79 is moved clockwise, as viewed in FIG. 1, to move index housing 63 and the platen 58, as well as elastomeric pad 86, 90° relative to slide 64. The slide 64 is then moved back under roller 19 to break the slice along the second set of scribe lines which, as illustrated in FIG. 5, are perpendicular to the first set of rows. It is accepted procedure to first orient the slice with the scribe lines 12, as illustrated in FIG. 5, parallel to the roller 19 so that the "short side" of the bars 11 are broken first as more force is required to break the bars along the "short side" than along the "long side." The slice is then indexed 90° by movement of handle 79 and a thin flexible film of plastic material may be applied to the top of the slice in abutment therewith to distribute the force exerted over 19 as the slice is pulled back under roller 19 to thus apply less force in breaking the slice along scribed lines 13 and thus minimize breakage of the bars 11.

As will be appreciated by those skilled in the art, the present invention is not limited to the specific embodiment described above. For example, an optimum pressure could be exerted against a slice to be broken by setting roller 19 at a predetermined distance above platen 58 and fixing roller 19 at this position relative to platen 58 so that the springs 46 and 47 are eliminated. An elastomeric pad having a predetermined durometer and thickness could then be placed upon the top of platen 58 and after placement of the slice to be broken upon the top of the rubber pads the platen 58 could be passed under roller 19 to achieve breakage of the slice along the line scribed thereon. This embodiment is not, however, preferred since it is necessary to provide a rubber pad of a particular thickness and durometer for each variety of slice to be broken. It will also be appreciated that rather than providing an elastomeric pad such as pad 86, the roller 19 could be coated with a suitable elastomeric material, or both the roller 19 and platen 58 covered with elastomeric material. The springs 46 and 47 could also be replaced with weight means, the amount of which could be varied.

Figure 4:
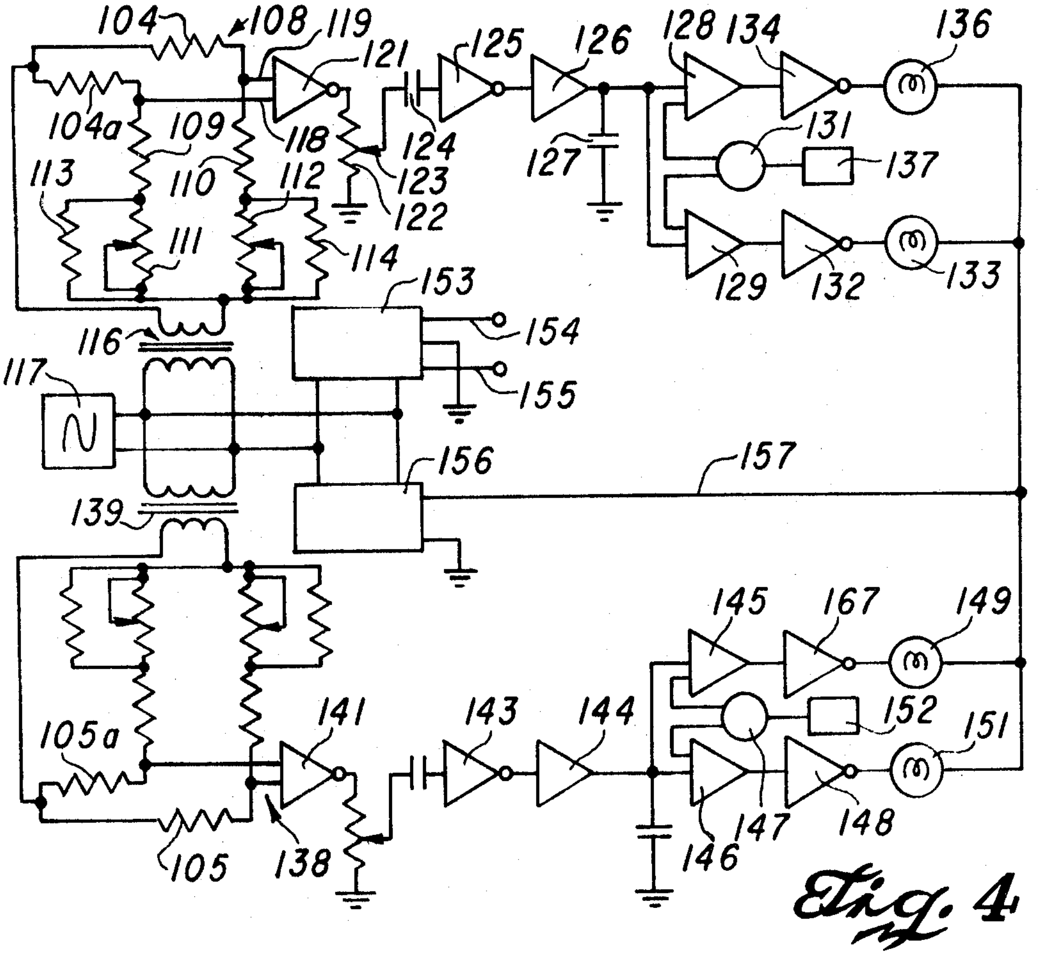
FIG. 4 is a schematic view of electrical circuitry which may be used with the embodiment of the invention illustrated in FIGS. 1 and 2.

The strain gauges need not be connected to electrical circuitry which would serve to display an indication of whether the force being exerted against the elastomeric pad 86 exceeded a desired maximum or minimum, but could be directly coupled, through amplification means, with a suitable voltage meter which would provide direct readings, though for use by relatively unskilled operators, the circuitry illustrated in FIG. 4 is preferred.

The slices to be broken may be placed between sheets of lint free paper or other pliable material, such as plastic, and may also be moistened with a desired fluid such as methanol and $H_2O$ to ensure desired adhesion thereto. However, the present invention is not limited to the breakage of slices which have been sandwiched between layers of paper to which a solution is applied or between plastic sheets of material or the like, since the vacuum in conduit 107 will assist in maintaining the slices in a desired position on pad 86 and ensure desired orientation of the bars after the slice has been broken. Other carrier means may then be utilized to maintain bar orientation during any workstep that may follow the slice breaking step.

By use of the embodiment of the invention illustrated and described above, the human error present in breaking processes now in use is eliminated, thus greatly increasing the number of useful bars of material available.

Particular cost savings are realized when the material to be broken is semiconductor material having, for example, integrated circuits and/or semiconductor devices formed thereon or therein.

While various specific terms have been used to describe a particular embodiment of the invention, they are not intended, nor should they be construed, as a limitation upon the invention as defined by the following claims.

What is claimed is:

1. A device for producing a plurality of separate units of predetermined geometry from a scribed slice of material, comprising in combination:
a slice-supporting member having an upper surface geometrically similar to the lower surface of said slice;
a force applying element;
means for adjustably positioning said element above said member;
means for adjustably biasing said element toward said member so that when said slice is positioned therebetween said element engages said slice at least along a finite zone of abutment and applies a desired force thereto; and
means for moving said member relative to said element so that when said slice is positioned therebetween said zone of abutment travels over said slice and breaks said slice along its scribe lines to produce said separate units.

2. The device of claim 1 wherein
said slice supporting member is a platen having a top planar surface; and
said force applying element is a roller having a longitudinal axis parallel to the top surface of said platen.

3. The device of claim 2, including:
means permitting upward movement of said roller when a force is exerted against the bottom thereof; and
means for applying a biasing force against said roller tending to force said roller back to a predetermined distance above said platen.

4. The device of claim 2, including:
a layer of resilient material positioned between the platen and the roller.

5. The device of claim 2, including:
a layer of resilient material affixed to the platen to provide a planar surface parallel to the longitudinal axis of the roller upon which a slice of semiconductor material can be positioned.

6. The device of claim 2, including:
means for sensing an externally applied downward force on the platen and generating a signal proportional to the magnitude; and
means responsive to the signal generated by said sensing means for displaying visual indication of the magnitude of the force being applied to the platen.

7. The device of claim 2, including:
means permitting upward movement of said roller when a force is exerted against the bottom thereof;
means of applying a biasing force tending to force said roller back to the predetermined distance above said platen; and
means for adjusting the magnitude of the biasing force.

8. The device of claim 7, including:

means for sensing an externally applied downward force on the platen and generating a signal proportional to the magnitude thereto; and means responsive to the signal generated by said sensing means for displaying visual indication of the magnitude thereof.

9. The device of claim 2, including:

means permitting upward movement of said roller when a force is exerted against the bottom thereof;

means for applying a biasing force against said roller tending to force said roller back to a predetermined distance above said platen; and a layer of resilient material positioned between the platen and the roller.

10. The device of claim 9, including:

means sensing any externally applied downward force on the platen and generating a signal proportional thereto; and means responsive to the signal generated by said sensing means for displaying visual indication of the magnitude of the force being applied to the platen.

11. A device for breaking scribed slices of semiconductor material to produce individual bars of semiconductor material, which device comprises:

a base;

pedestals affixed to said base and positioned in a spaced apart relationship to define a gap therebetween;

a roller supported across the gap defined between the pedestals;

means supported by each of said pedestals which rotatably support the ends of the roller;

a semiconductor slice supporting platen positioned in said gap below said roller at a predetermined vertical distance therefrom and having a top planar surface which is parallel to the axis of the roller;

means supported by said pedestals for adjusting the vertical height of each end of said roller relative to said platen;

means for moving the platen relative to said roller so that a slice of semiconductor material supported by said platen will be broken along the lines scribed therein due to the compressive force applied thereto during movement of the roller relative to the platen;

means permitting upward movement of said roller relative to said platen; and spring means urging said roller downwardly to the predetermined distance above said platen.

12. The device of claim 11, including:

means for adjusting the force exerted by the spring means upon the roller.

13. The device of claim 12, including:

an elastomeric pad supported on the top surface of said platen, the pad having a planar top surface which is parallel to the axis of said roller.

14. The device of claim 13, including:

a strain gauge interposed between the top surface of said elastomeric pad and the top surface of said platen for sensing a force applied against the top surface of the pad and generating a signal proportioned to the force;

means for amplifying the signal generated by the sensing means;

means for comparing said amplified signal with predetermined maximum and predetermined minimum reference signals; and means for displaying a visual indication of the magnitude of the amplified signal when the sensing means exceeds the predetermined maximum signal or is less than the predetermined minimum signal.

15. The device of claim 14 wherein said strain gauge is so positioned between the top surface of said pad and said platen that the gauge generates a signal responsive to a force exerted on one half of said pad and said device includes:

a second strain gauge interposed between the top surface of said elastomeric pad and the surface of said platen for sensing force exerted on the other half of said pad;

means for amplifying the signal generated by the second sensing means;

means for comparing said amplified signal generated by the second sensing means with a predetermined maximum and a predetermined minimum reference signal; and means for displaying a visual indication when the magnitude of the amplified signal from the second sensing means exceeds the predetermined maximum signal or is less than the predetermined minimum reference signal.